(No Model.)
A. G. JOHNSON.
GRAPE HOE OR CULTIVATOR.
No. 584,739. Patented June 15, 1897.
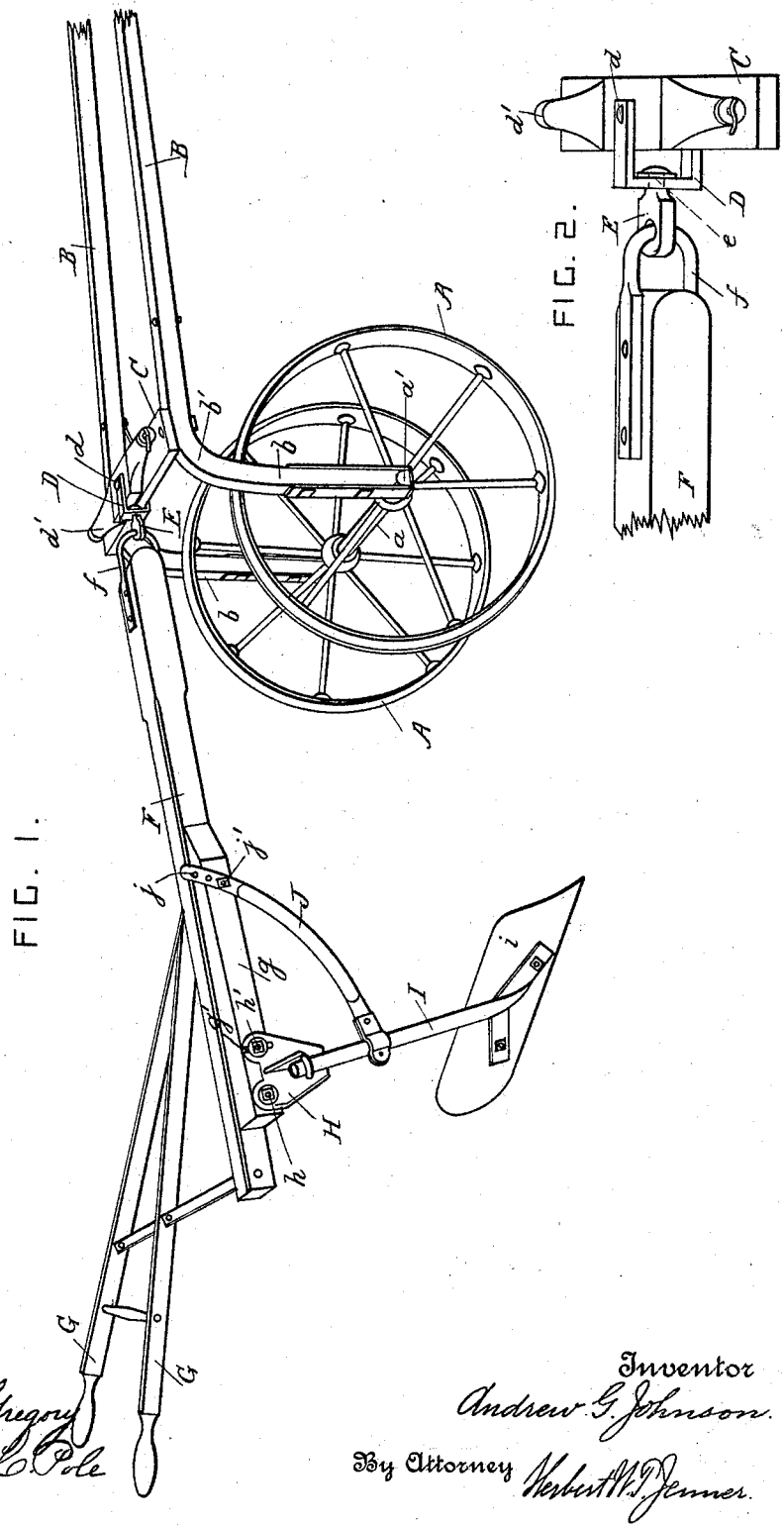
Witnesses
Frank D. Gregory
Thomas E. Pole
Inventor
Andrew G. Johnson.
By Attorney
Herbert W. T. Jenner.
THE NORRIS PETERS CO., PHOTO-LITHO., WASHINGTON, D. C.

UNITED STATES PATENT OFFICE.

ANDREW G. JOHNSON, OF WESTFIELD, NEW YORK, ASSIGNOR OF ONE-HALF TO ALFRED H. HAYES, OF BUFFALO, NEW YORK.

GRAPE HOE OR CULTIVATOR.

SPECIFICATION forming part of Letters Patent No. 584,739, dated June 15, 1897.

Application filed September 15, 1896. Serial No. 605,892. (No model.)

*To all whom it may concern:*

Be it known that I, ANDREW G. JOHNSON, a citizen of the United States, residing at Westfield, in the county of Chautauqua and State of New York, have invented certain new and useful Improvements in Grape Hoes or Cultivators; and I do hereby declare the following to be a full, clear, and exact description of the invention, such as will enable others skilled in the art to which it appertains to make and use the same.

This invention relates to grape hoes or cultivators; and it consists in the novel construction and combination of the parts hereinafter fully described and claimed.

In the drawings, Figure 1 is a perspective view of the whole machine. Fig. 2 is a perspective view of the universal joint which connects the beam to the cross-bar.

A are the wheels, mounted on the axle $a$.

B are the shafts, between which a horse or other similar animal is harnessed. The main portions of the shafts are substantially horizontal and their rear portions $b$ are bent downwardly into a nearly vertical position, the curved parts $b'$ of the shafts being arranged above the tops of the wheels.

C is a cross-bar secured to the curved parts $b'$ of the shafts above the wheels and connecting the shafts together. The axle $a$ is journaled in bearings $a'$ at the lower ends of the rear portions $b$ of the shafts.

D is a shackle provided with a pin $d$, which passes vertically through the central part of the cross-bar. The singletree $d'$ is mounted on the pin $d$ above the cross-bar and is provided with hooks for the attachment of the traces in any approved manner.

E is an eye provided with a stem $e$, which is swiveled in the shackle D.

F is the beam of the cultivator, provided at its front end with a vertical loop $f$, which engages with the eye E. The beam is practically connected to the cross-bar by a universal joint.

The beam of the cultivator is arranged with its rear end lower than its front end and is provided with handles G, arranged upon one side of it.

A block $g$ is secured to the other side of the beam F from the handles, and H is a bracket pivoted at its rear upper corner to the block $g$ by a pin $h$. The front upper corner of the bracket is provided with a vertical slot $g'$, and $h'$ is a bolt passing through the slot $g'$ and securing the bracket after its vertical position has been adjusted.

I is the cultivator-standard, journaled in the bracket H and provided at its lower end with a removable blade $i$ of any approved shape.

J is a curved arm clamped to the standard and provided with a series of holes $j$ at its front end. A bolt $j'$ is provided for passing through either of the holes $j'$ and securing the arm J to the front part of the block $g$. The standard can be revolved when unclamped from the arm, so as to adjust the angle of the blade.

This cultivator is of great use in cultivating vineyards in which the vines are trained upon horizontal wires extending between posts, as the blade can be thrown over to one side, so as to cultivate under the wires between the posts, and it can also be turned upon the swivel, so as to cultivate the side of the trough or furrow between the vines. The blade will also cultivate ground higher than that upon which the wheels rest, because of the inclined position of the beam. When the blade engages with the ground, the front ends of the shafts are pulled upward and the wheels are pressed downward on the ground, so that it is impossible for them to slip sidewise.

What I claim is—

1. The combination, with the substantially horizontal shafts provided with downwardly-projecting rear ends, wheels carried by the said ends, and a cross-bar secured to the shafts above the said wheels; of a cultivator provided with an upwardly and forwardly inclined beam having a vertical loop at its front end, a singletree, a shackle provided with a pin passing through the central parts of the said singletree and cross-bar, and an eye engaging with the said loop and provided with a stem swiveled in the said shackle, substantially as set forth.

2. The combination, with a cultivator-beam, of a bracket pivoted at its rear corner to the beam and provided with a slot at its front corner, a bolt passing through the said slot in different positions, the said bracket, standard and arm being pivotally adjustable, and the standard being revolubly adjustable, revoluble in the said bracket, and a curved arm clamped to the said standard and provided with means for connecting its front end to the beam and a removable cultivating instrument attached to the said standard, substantially as set forth.

3. The combination, with the shafts having downwardly-projecting rear ends, an axle carried by the said ends, wheels mounted on the said axle between the said ends, and a crossbar secured to the said shafts above the said wheels; of a cultivator, and a universal joint connecting the beam of the said cultivator with the said cross-bar, substantially as set forth.

In testimony whereof I affix my signature in presence of two witnesses.

ANDREW G. JOHNSON.

Witnesses:
   A. B. OTTAWAY,
   CORA E. OTTAWAY.